(No Model.) 2 Sheets—Sheet 1.
H. C. CRANE.
COMBINED LETTER STAMP CANCELER, DATER, AND NUMERICAL REGISTER.
No. 413,847. Patented Oct. 29, 1889.
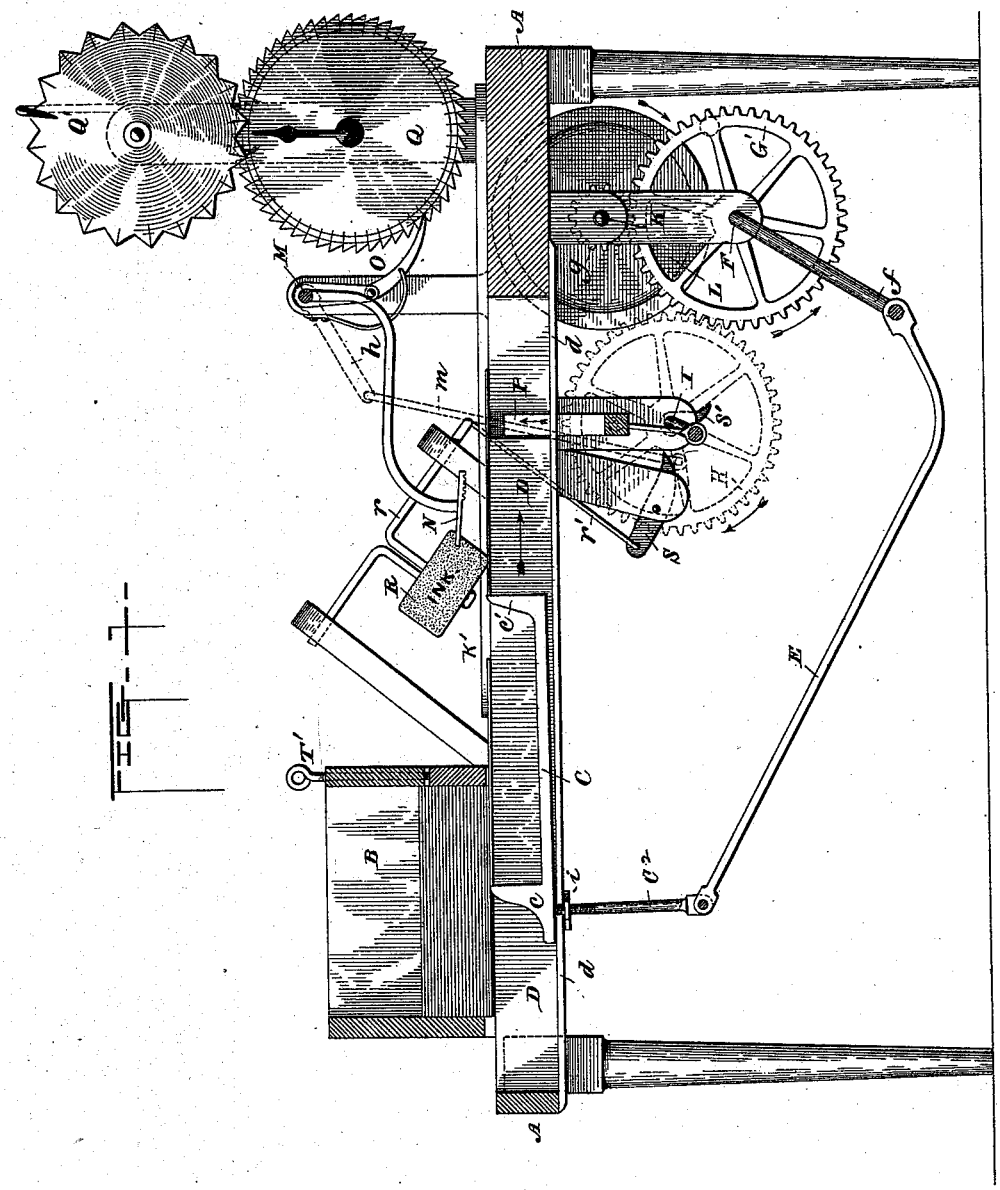
WITNESSES:
INVENTOR,
Hugh C Crane
R. E. Dye
Att'y.
N. PETERS, Photo-Lithographer, Washington, D. C.

(No Model.) 2 Sheets—Sheet 2.
H. C. CRANE.
COMBINED LETTER STAMP CANCELER, DATER, AND NUMERICAL REGISTER.
No. 413,847. Patented Oct. 29, 1889.
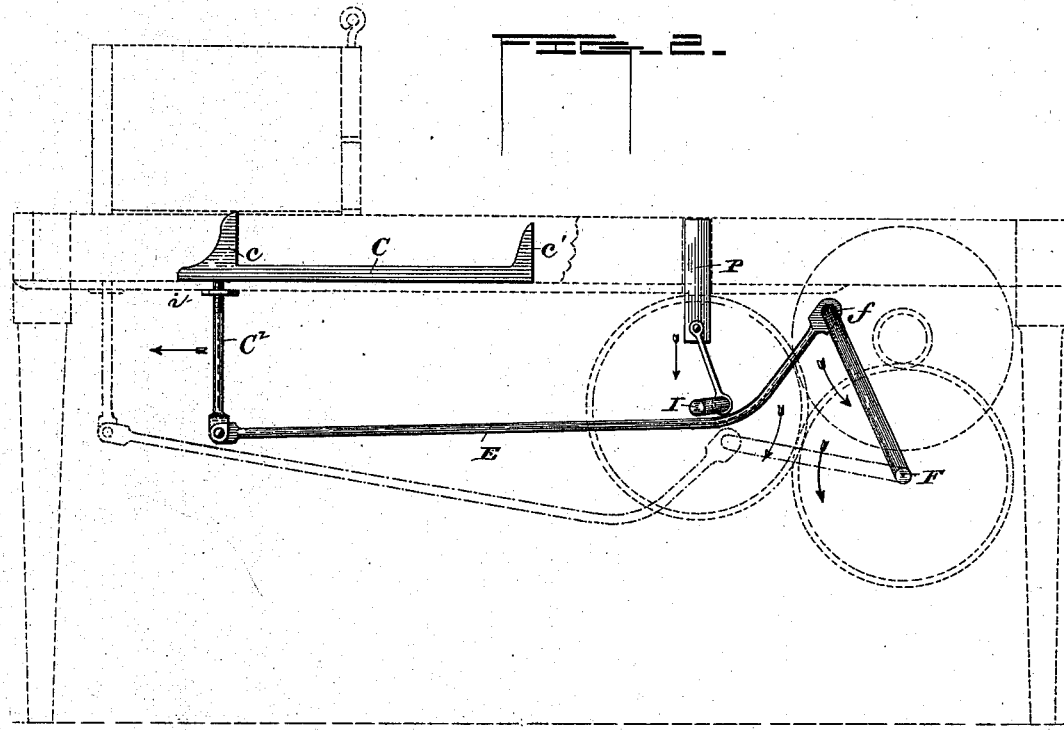
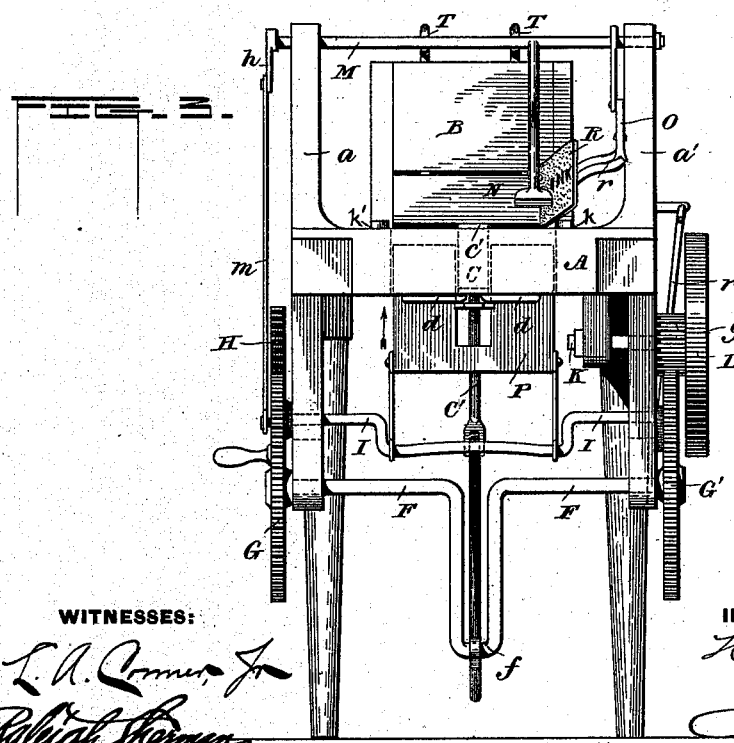
WITNESSES:
INVENTOR,
Hugh C Crane
Att'y.

UNITED STATES PATENT OFFICE.

HUGH C. CRANE, OF FOREST, MISSISSIPPI.

COMBINED LETTER-STAMP CANCELER, DATER, AND NUMERICAL REGISTER.

SPECIFICATION forming part of Letters Patent No. 413,847, dated October 29, 1889.

Application filed July 11, 1888. Serial No. 279,647. (No model.)

*To all whom it may concern:*

Be it known that I, HUGH C. CRANE, a citizen of the United States, residing at Forest, in the county of Scott and State of Mississippi, have invented certain new and useful Improvements in a Combined Letter-Stamp Canceler, Dater, and Numerical Register; and I do hereby declare the following to be a full, clear, and exact description of the invention, such as will enable others skilled in the art to which it appertains to make and use the same.

In the description similar letters relate to similar parts throughout the several views.

Figure 1 is a longitudinal sectional view of my device. Fig. 2 is a view showing more clearly the operation of the main acting pitman. Fig. 3 is an end view, the registering device being removed.

A is a table; B, letter-box; K and K', guide to letter.

C is a carriage having the fingers $c$ and $c'$ attached on its opposite ends, said carriage being adapted to move backward and forward in the slot D and upon a way $d\ d$, which is attached to the under side of the table A and along the slot D, in which said fingers move. Said carriage is attached to the pitman E by means of the projecting arm $c^2$, which is attached to said carriage near the end and under the finger $c$, said pitman being connected to the axle F, said axle and the attached wheels being driven by means of a handle or crank, or by any suitable power. The said axle F is bent in its center, forming a long crank $f$, to which the curved end of the pitman E is connected, and around and through which said curved end revolves, as shown in the drawings.

The ends of the axle F are journaled in and supported by suitable bearings, one end of said axle carrying the wheel G, which is firmly attached thereto, and the opposite end carrying the wheel G', which is the exact counterpart of the former, and which, in like manner, is firmly attached to the end of said axle. The wheel G is provided with cogs and adapted to engage the wheel H upon the axle I. The wheel G' upon the opposite end of the axle F is adapted to engage the cogs in a small spur-wheel $g$ upon the shaft K, said shaft having its support in suitable bearings and carrying the balance or fly wheel L, said balance or fly wheel being firmly secured to said shaft K.

The carriage C, to which the fingers $c$ and $c'$ are attached, is so constructed and attached that when it has reached the extreme point of movement to the left and the movement begins to the right both of said fingers are elevated in the slot D slightly above the surface of the table; but as the movement of the carriage begins on its return to the left the finger $c'$ is immediately carried below the surface of the table, while the finger $c$ does not pass below the surface of the table, but, being inclined, easily slides under the envelopes in the box B, being adapted to engage more sharply an envelope when the movement begins to the right by reason of the elevation of the free end of the carriage C. As the pitman E passes the center and the movement begins to the right, the finger $c'$ is instantly elevated above the surface of the table in the slot D sufficient to engage a letter, and both fingers are always above the surface of the table in the movement of the carriage to the right, and until the pitman E passes the center and the movement begins to the left, $c$ bringing a letter to be stamped, and $c'$ discharging the letter already stamped. In the movement of the carriage to the left the finger $c'$ is always carried in the slot below the table; but in the movement to the right it is always elevated above the surface of the table. The elevation of the finger $c'$ also elevates the finger $c$, or brings it more sharply to engage the letter in the box B, and the depression of $c'$ also slightly depresses $c$; but $c$ is never below the surface of the table in either movement. The cause of the elevation of the fingers $c$ and $c'$ in the movement to the right is owing to the elevation of the free end of the carriage C by pivotal force, and the corresponding depression in the movement to the left is from pivotal force.

The carriage C is secured to the way by means of a shoulder, jam-nut, or washer $i$, placed upon the projecting arm $c^2$ below and between the under side of the way $d$ and near the end of the carriage above, the opposite end of the carriage riding upon its bearings and being free in the slot D to move up and down as the carriage moves backward and forward. The projecting arm $c^2$ is attached to the carriage below the finger $c$, as already described, and the power to drive said carriage is applied to the lower end of said arm through the medium of the pitman E, which is connected to the crank-shaft F, as already seen, and in the movement of the carriage from right to left the power operates on said arm in a line parallel to the line of movement of said carriage in that direction, but on the return of the carriage to the right the power operates upon said arm $c^2$ at an angle of about sixty degrees below the line of motion of said carriage. The power being applied at an angle below the line of motion of the carriage in its movement to the right, the free end of said carriage is raised by pivotal force. The finger $c'$, being attached at the free end of the carriage C, is elevated or depressed as the carriage is raised or depressed, and $c$ is slightly raised above its normal position as $c'$ is raised, as already stated. The left side of the finger $c$ in the present instance is rounded off, so as to pass smoothly under the letters in the box B, while the opposite side of said finger is adapted to engage a letter on the movement to the right.

P is a stop, which is adapted to rise automatically above the surface of the table for the purpose of arresting and holding the letter to be stamped, and afterward falling below the table to allow the finger $c'$ to discharge the letter, as hereinafter more fully described.

The axle I, to which the wheel H is attached, is provided with suitable bearings, and is bent at right angles near its ends, forming shoulders or a crank-shaft, and the said stop P is connected by rods to said crank-shaft, acting as pitmen, by means of which said stop is raised automatically above the table or is carried below as said axle I is revolved.

M is a rod or axle journaled in and having proper supports $a$ and $a'$, and is connected to a spoke of the wheel H by means of the arm $h$ and the pitman $m$. Said axle supports or carries an arm or pawl, at the end of which is attached the stamp-canceler and dater N, said axle also carrying the pawl O, which moves the register Q and Q', as shown, said pawl O being held in place by a spring.

N is a stamp-canceler and dater.

R is an ink-pad attached to a rod having proper supports, said rod connecting by an arm and the pitman $r'$ to the lever S, which is so placed as to engage the cam or trip S' at the opposite end of the crank-shaft I.

T and T' are screws to adjust the exit for letters.

All the parts herein described are operated by means of power applied to the handle or crank on the wheel G, and all the parts are so timed and arranged in construction that each part shall perform its allotted function, as herein described, and set forth in the drawings.

The pawl O operates the register Q and Q', one notch on Q as a letter is stamped. The operation of the register is obvious.

R is an ink-pad, which is attached to the loop of the rod $r$. Said rod is supported in suitable bearings, its end being bent, forming a crank, which is connected by the rod $r'$ to the lever S, said lever S having proper support and being adapted to be engaged by the cam S', which is firmly attached to the end of the axle I, as shown. At each revolution of the axle I the cam S' engages the lever S, and by means of the combination the pad is raised and moved to touch the stamp N at the moment when said stamp reaches its highest elevation and to fall out of the way before the said stamper descends upon the letter.

The operation of the machine is quite obvious. The parts having been adjusted as described, the letters to be stamped are placed face upward in the box B and the handle on the wheel G is turned to the left. The carriage C, moving in the same direction, carries the finger $c$ beneath the letter-box. $c'$, as the movement begins, passes below the surface of the table and remains below until the pitman E passes the center and the carriage begins the movement to the right; but instantly as the carriage begins its movement to the right its free end is raised and $c'$ is elevated above the surface of the table, and so remains during the entire movement to the right; and, as already explained, $c$ is also slightly elevated and made to engage more sharply the lower letter in the box, which it brings forward, and at the instant $c'$ passes the stop P said stop rises automatically above the surface of the table and arrests and holds the letter, while the stamp N falls upon the letter and does its work. As the carriage begins its movement to the left, $c'$ passes below the letter just stamped, and on its return to the right discharges the letter into the basket or sack at the end of the table, the stop P having passed below the surface of the table, so as to allow the letter to be discharged. As each letter is discharged, it is indicated on the registering device, the pawl O moving one notch.

Having now fully described my invention, what I claim as new, and desire to secure by Letters Patent, in a letter-stamp, is—

The combination of the stamp N, provided with the table A A, having the letter-box B, the guides $k$ and $k'$, the stop P and its connecting-pitman, the carriage C, having the fingers $c$ and $c'$, the way $d\ d$, the projecting arms $c^2$, the pitman E, the crank $f$ of the shaft F, the cog-wheels G and G', the shaft I and the cog-wheel H, the shaft K and the spur-wheel $g$ and the fly-wheel L, the cam S' and lever S, the rod or axle M and its supports $a$ and $a'$, with its arm $h$ and the pitman $m$, the ink-pad R, the rod $r$ and its supports, the connecting rod or pitman $r'$, the pawl O and its spring, the regulation-screws T and T', and the registering device Q and Q', as and for the purposes substantially as described.

In testimony whereof I affix my signature, in presence of two witnesses, this 4th day of July, 1888.

HUGH C. CRANE.

Witnesses:
T H. SIMS,
GEO. B. ANTHEY.